United States Patent
Weverka

Patent Number: 5,165,104
Date of Patent: Nov. 17, 1992

[54] OPTICAL INTERCONNECTING DEVICE AND METHOD

[75] Inventor: Robert T. Weverka, Boulder, Colo.

[73] Assignee: Optivideo Corporation, Boulder, Colo.

[21] Appl. No.: 664,336

[22] Filed: Mar. 1, 1991

[51] Int. Cl.$^5$ .............................................. G02B 6/10
[52] U.S. Cl. .......................................... 385/7; 385/17; 385/14; 385/24
[58] Field of Search .................... 385/8, 9, 14, 21, 24, 385/4, 11, 7, 10

[56] References Cited

U.S. PATENT DOCUMENTS

| | | | |
|---|---|---|---|
| 4,455,064 | 6/1984 | Kenan | 385/7 X |
| 4,773,063 | 9/1988 | Hunsperger et al. | 385/14 X |
| 4,801,872 | 1/1989 | Kitano | 385/14 X |

FOREIGN PATENT DOCUMENTS 0034126 2/1987 Japan ....................................... 385/7

OTHER PUBLICATIONS

Chen S. Tsai, "Guided-Wave Acoustooptic Bragg Modulators for Wide-Band Integrated Optic Communications and Signal Processing", IEEE Transactions on Circuits and Systems, vol. CAS-26, No. 12, Dec. 1979.

Chen S. Tsai, "Wideband Acousto-Optic Bragg Diffraction in LiNbO$_3$ Waveguide and Applications", Springer Series in Electronics and Photonics, vol. 23, 1990.

Colin K. Campbell, "Applications of Surface Acoustic and Shallow Bulk Acoustic Wave Devices", Proceedings of the IEEE, vol. 77, No. 10, Oct. 1989.

Primary Examiner—John D. Lee
Assistant Examiner—Stephen W. Barns
Attorney, Agent, or Firm—Harold A. Burdick

[57] ABSTRACT

An optical interconnecting device and method are disclosed for selectively directing signals from an array of optical inputs to an array of optical outputs through an optical medium. The input signals are angularly multiplexed and redirected by dynamic gratings of the appropriate spatial, or grating, frequency. Spatially periodic optical index perturbations propragated in the medium are utilized to achieve the dynamic gratings. The angles at which light is input to the gratings (input angles) and angles at which light is collected from the gratings (output angles) are selected to allow each grating frequency to connect signals at only one input angle to one output angle and thus only one optical output. The number of resolvable gratings required is the product of the number of inputs and the number of output. For the interconnection of an equal number of inputs and outputs connected in a one to one permutation, only a number of gratings equal to the number of inputs need be present simultaneously.

20 Claims, 5 Drawing Sheets

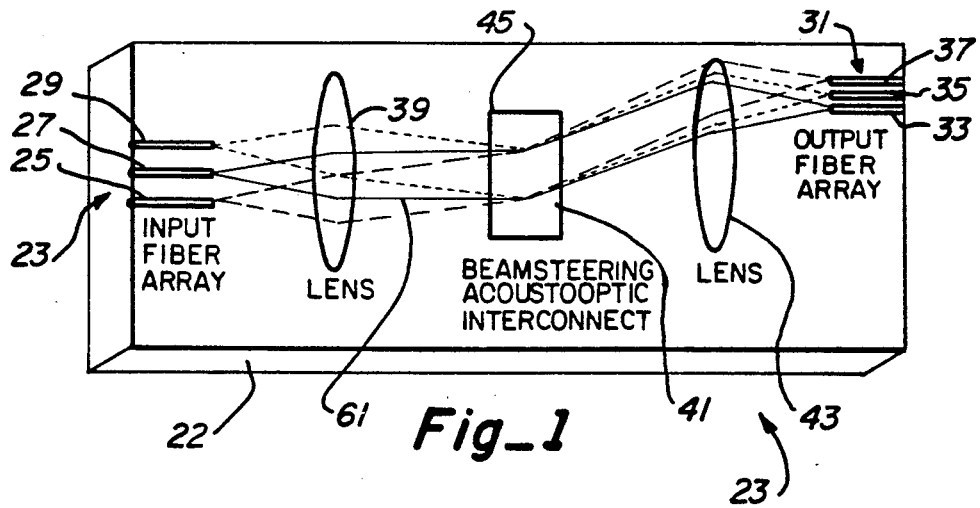
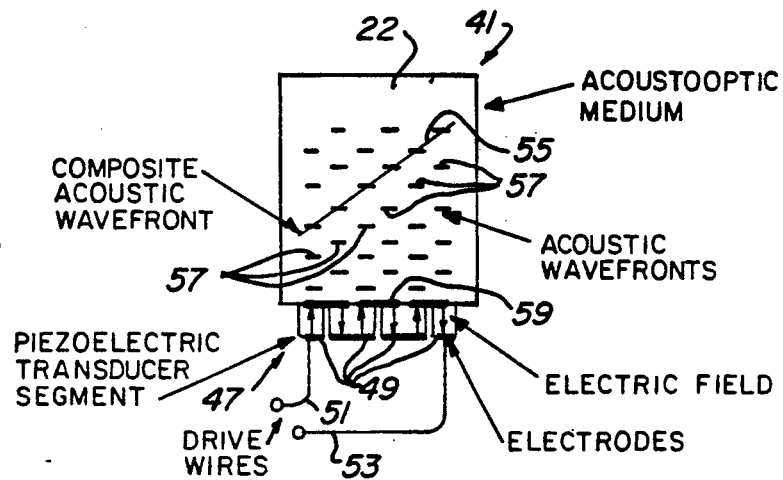
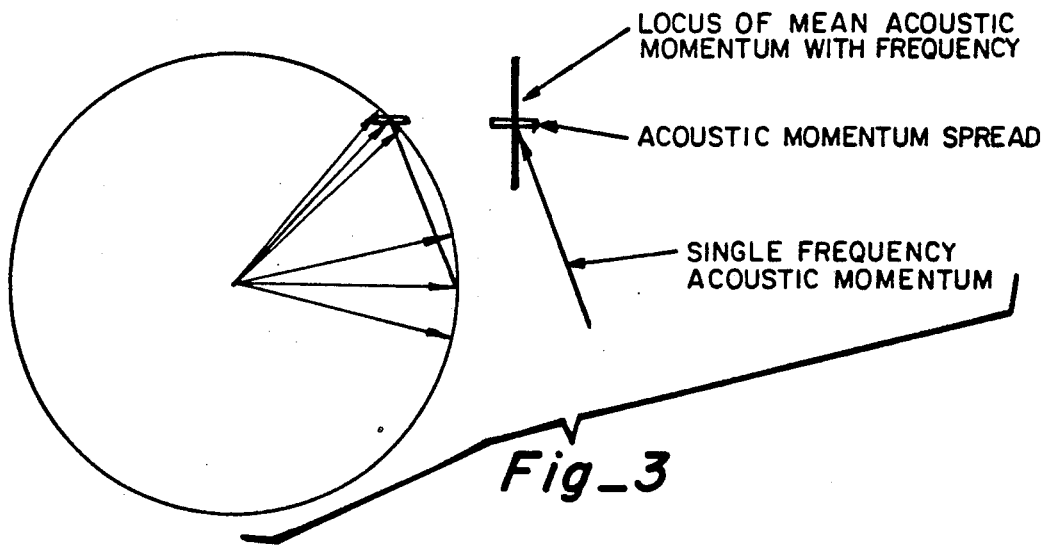

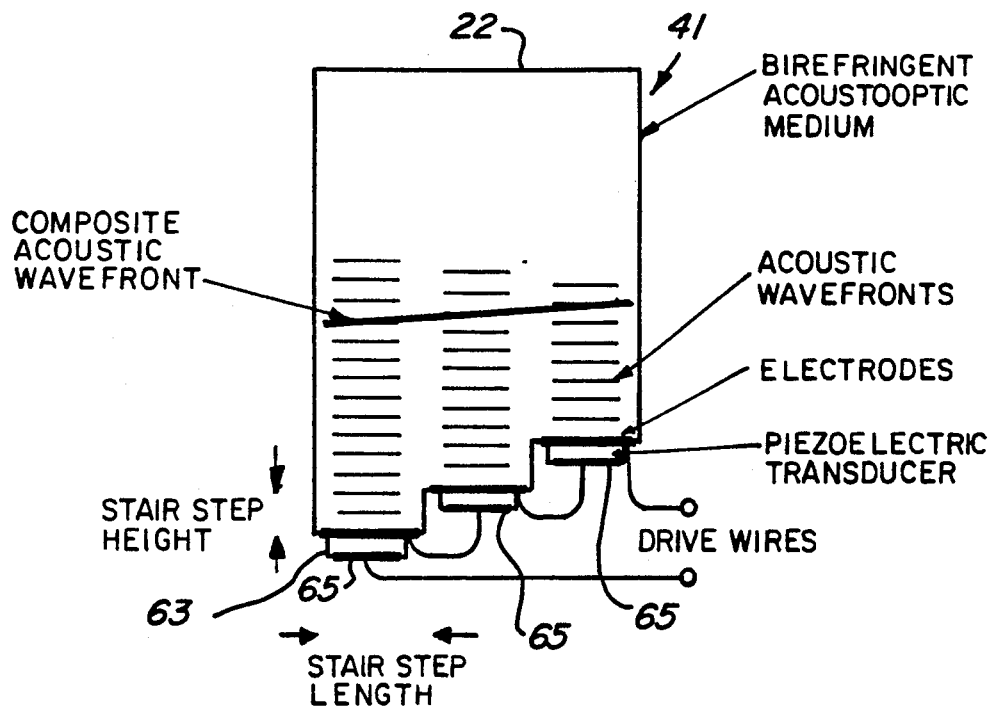
Fig_4
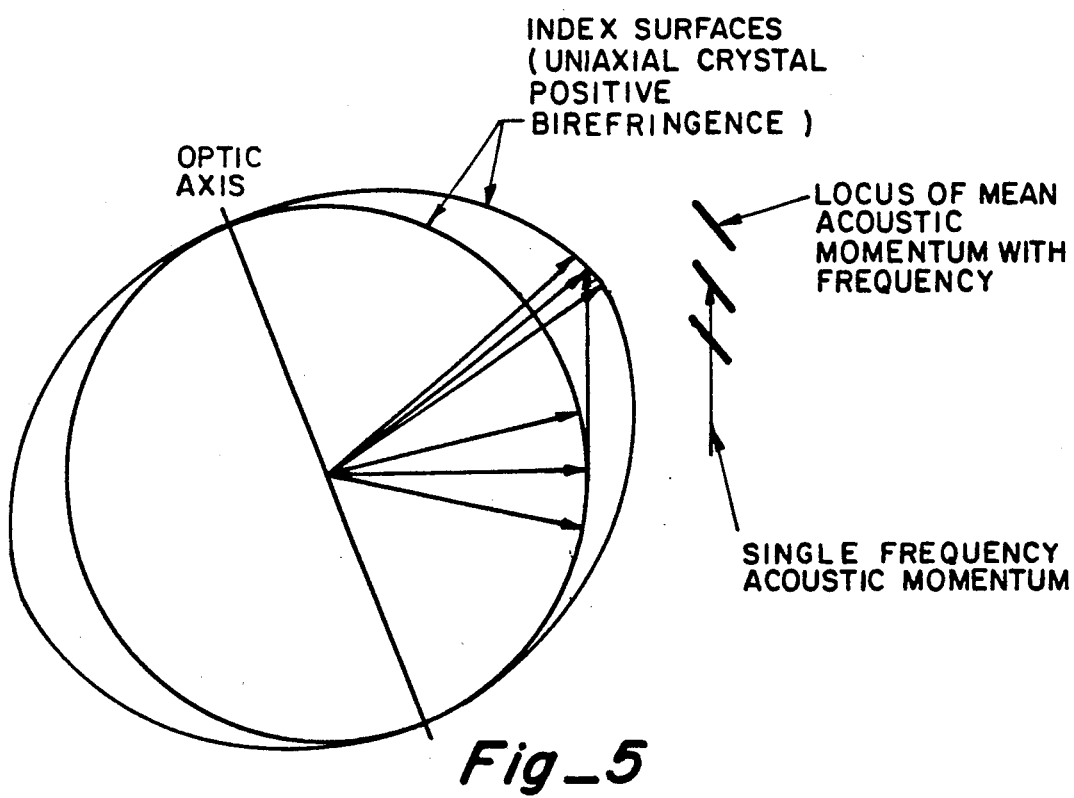
Fig_5

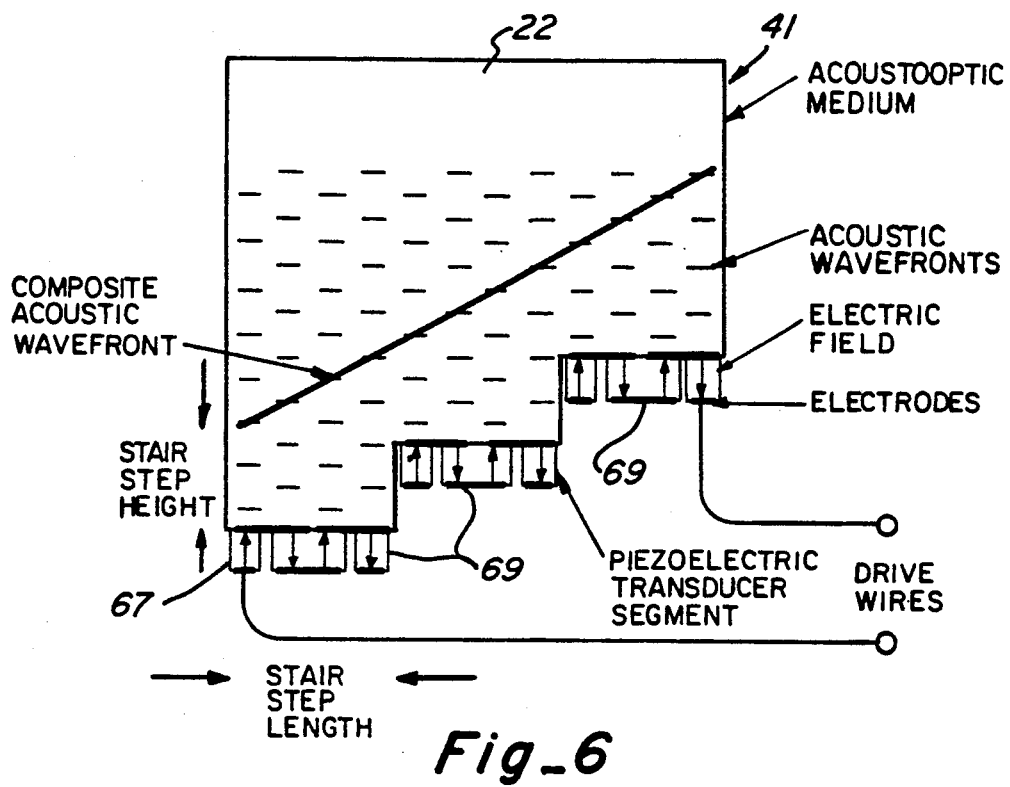
Fig_6
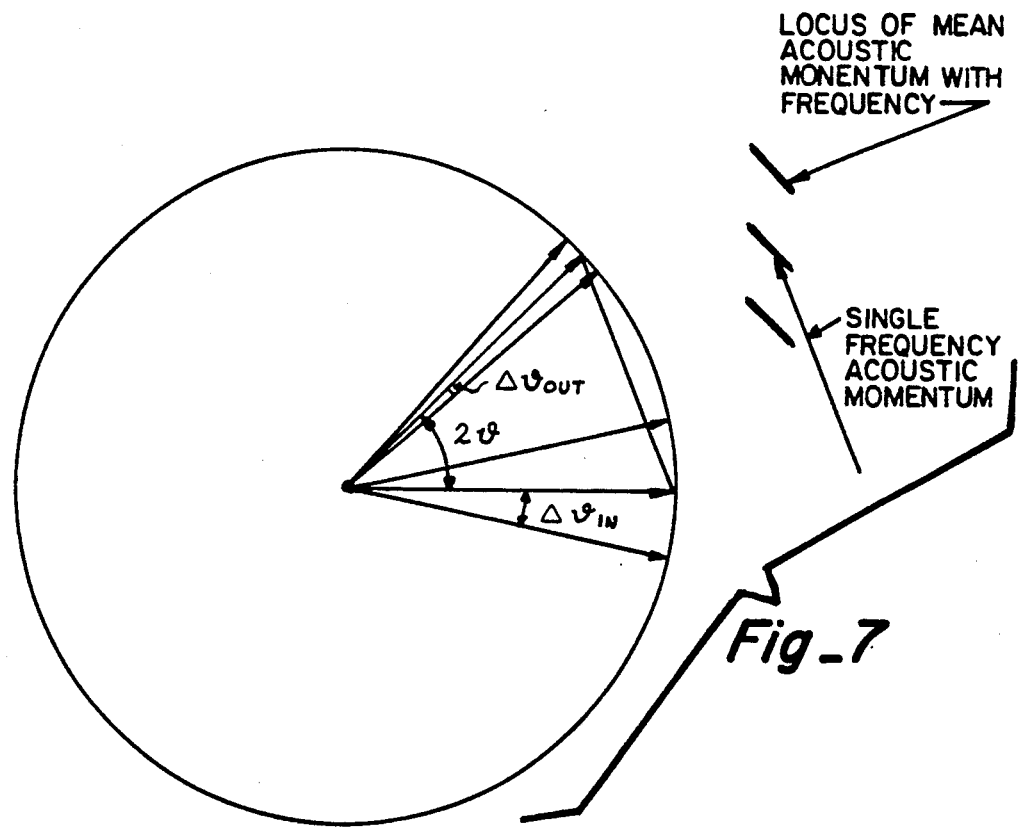
Fig_7

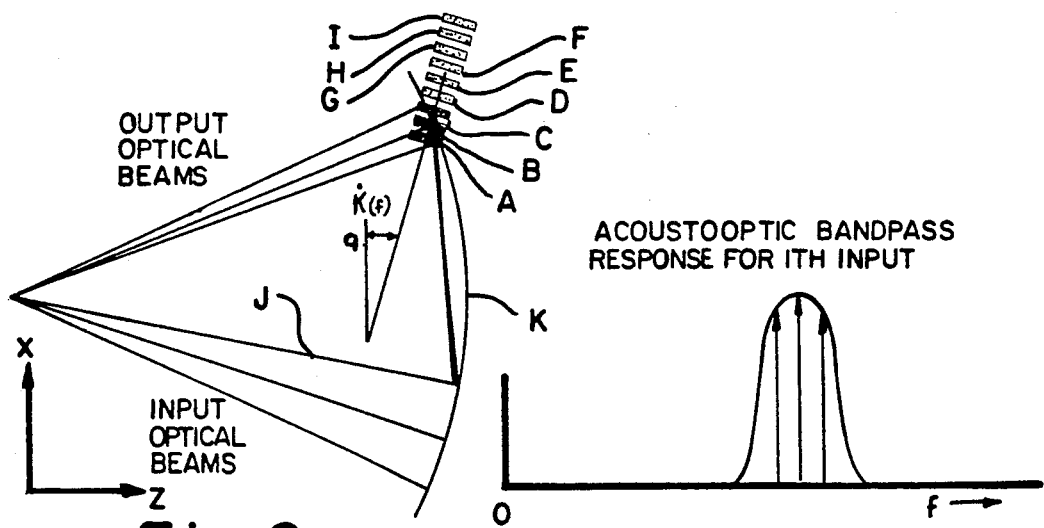
Fig_8a
Fig_8b
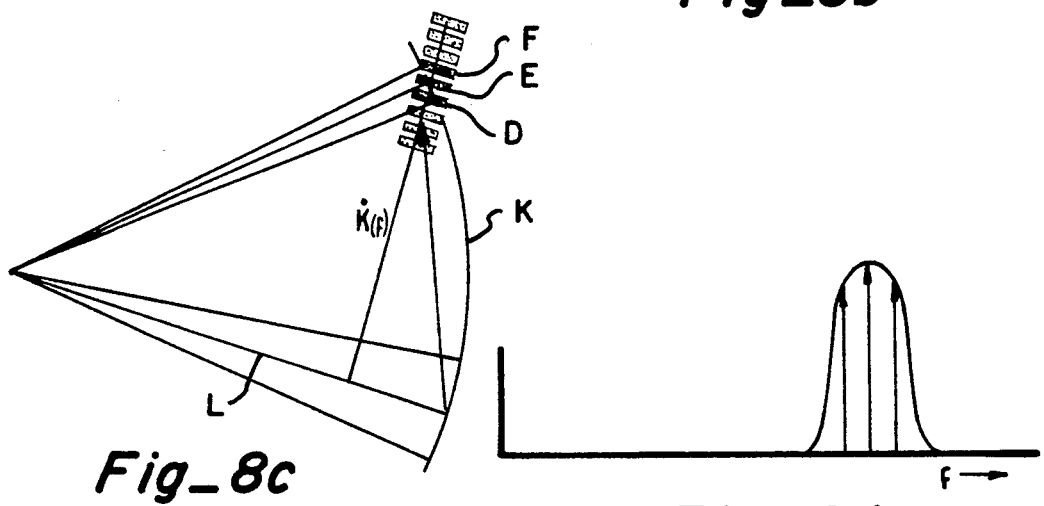
Fig_8c
Fig_8d
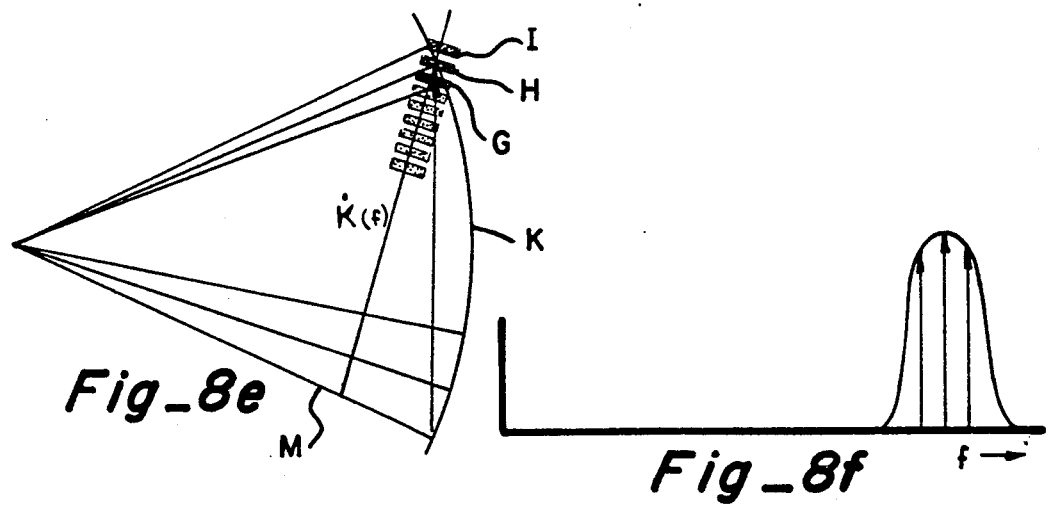
Fig_8e
Fig_8f

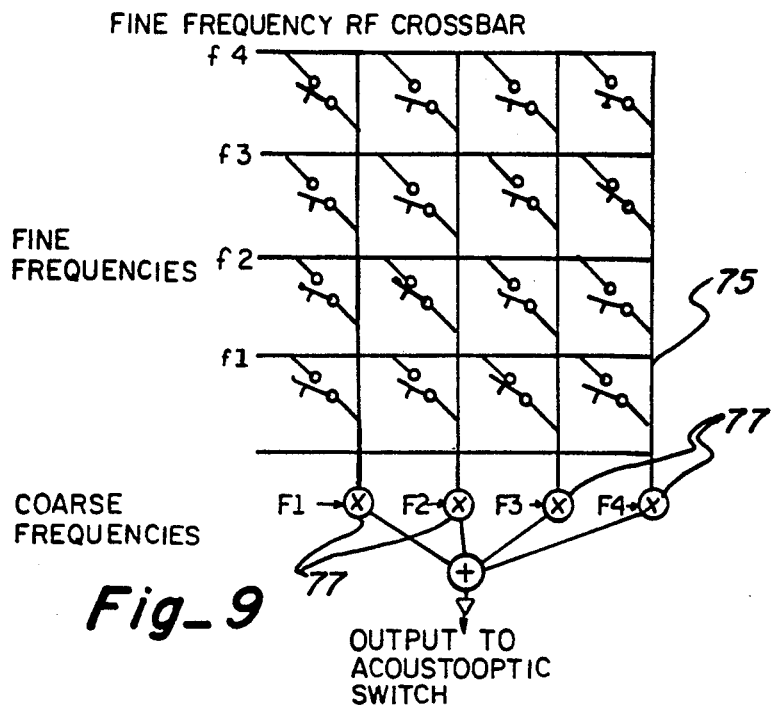
Fig_9
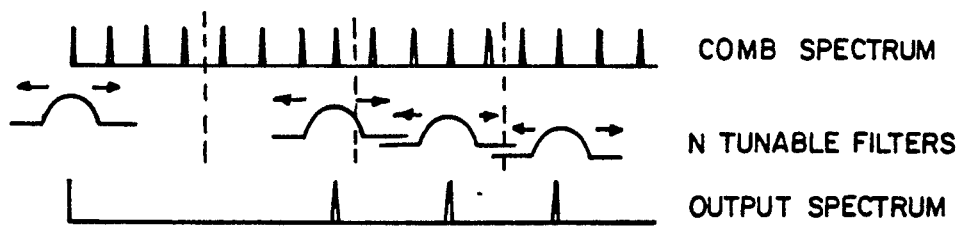
Fig_10b
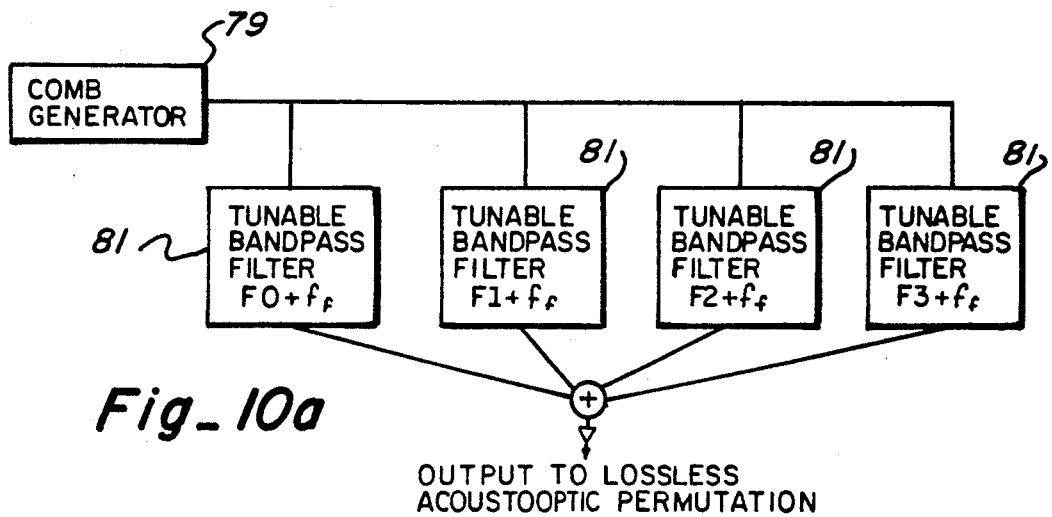
Fig_10a

OPTICAL INTERCONNECTING DEVICE AND METHOD

FIELD OF THE INVENTION

This invention relates to optical interconnections and, more particularly, relates to dynamic optical interconnecting devices and methods.

BACKGROUND OF THE INVENTION

High bandwidth, reconfigurable interconnection networks have been heretofore suggested and/or utilized in digital electronic parallel processors and distributed computing networks. Such networks as have heretofore been utilized, however, are becoming communication limited as processing speeds continue to increase.

Optical interconnection techniques using fiber optics or free space broadcasting offer extremely high bandwidth capabilities, but routing flexibility and performance of currently available approaches are insufficient for many applications.

For example, heretofore known optical space division interconnection networks have included crossbars based on spatial masking and crossbars based on angular deflectors. These networks have utilized several different switching approaches including matrix-vector multipliers, beam deflection approaches based on acoustooptic devices, optical systolic and engagement arrays, holographic crossbars, optoelectronic photoconductor matrices, and networks of $LiNbO_3$ directional couplers.

The first five approaches suffer from optical throughput inefficiencies due to fan-in and fan-out losses, although these limitations can in part be alleviated by using active deflectors and receivers. The directional coupler approach suffers coupling losses when trying to stitch together a large switch from arrays of small switches. Fan-out losses lead to an optical throughput efficiency for optical crossbars which fall off as $1/M$, where M is the number of output nodes being interconnected. When the crossbar is used to interconnect an array of N single mode fibers at the input to an array of M single mode fibers at the output, an additional loss factor of $1/N$ is incurred due to fan-in losses, yielding an overall loss of $1/NM$. For large networks this is an unacceptably low optical throughput, particularly in single mode fiber reconfigurable networks.

The optical matrix-vector multiplier based optical interconnection networks provide an array of N optical input data channels. The data channels, carried on fiber optic transmission lines, are spatially multiplexed in the x direction providing a uniformly spaced linear array. A sphere cylinder lens system images this array in the x direction and uniformly spreads and collimates the light in the y direction onto a 2-dimensional spatial light modulator (SLM). The SLM consists of an array of NxM pixels which can be selectively made opaque or transparent under electrical or optical control. A cylinder sphere lens system following the SLM collects all of the transmitted light from each row of the SLM and images the various columns onto an array of M output fibers which are uniformly spaced and multiplexed in y. For a crossbar interconnect, only one aperture is opened in each row and column. Thus, the SLM mask acts as a permutation matrix, redirecting light from each input fiber to the desired output fiber.

This system could implement a generalized crossbar with broadcast capabilities by opening more than one aperture in each column, and providing wired OR gates implemented by opening more than one pixel per row. However, optical losses suffered by this architecture (the fan-out of light from each input fiber to an entire column of M pixels with only one transmissive results in the $1/M$ fan-out losses, with fan-in losses being unavoidable due to the constant radiance theorem unless the output fiber has a larger mode volume than the input) makes this approach unattractive for many applications.

Several approaches to utilizing deflectors for interconnections have been advanced, including approaches based on magnetic domains, acoustooptic deflectors and holography. Such interconnections utilizing acoustooptics require one deflector per transmitter, with these stacked into a multichannel Bragg cell. An array of fiber inputs (N) are uniformly spaced and multiplexed in y, collimated in x and imaged in y onto a multichannel acoustooptic device, so that each acoustic channel is illuminated at the Bragg angle by one of the fiber inputs. This is accomplished with a grin rod lens array or a sphere-cylinder lens pair.

A plurality of piezoelectric acoustic transducers is driven by an RF single tone which deflects the diffracted light input from the fiber in the x direction by an amount proportional to the applied frequency. A Fourier transform lens is used to convert the diffraction angles into positions in x and to collect the light from each of the input channels onto an array of output fibers positioned along the locus of diffracted spots in the Fourier plane. Each output fiber corresponds to a single input RF frequency, and any input fiber can be deflected to a given output fiber by applying the appropriate input frequency. Thus, this system implements a crossbar with O(N) (O=order) acoustooptic devices.

While this system has substantially eliminated the fan-out losses when implemented in a permutation network, it still suffers fan-in losses when the mode volume of the output fibers is the same as that of the input fibers, resulting in a reduction of overall efficiency. In addition, while a broadcasting network can be implemented utilizing this approach by driving the transducer in the broadcasting channel with multiple RF frequencies, the diffraction efficiency into each receiving channel will fall off in proportion to the degree of fan-out.

Switching matrices made from arrays of directional couplers and intersecting waveguide switches have also been suggested for configurable optical interconnection applications. The directional coupler acts as a primitive $2 \times 2$ switch, and these can be combined into larger networks by using them as the $N^2$ crosspoints of a crossbar or as the $3N \log N$ exchange-bypass modules in a multistage interconnection network.

One of the main disadvantages of using these switches in a centralized switching facility is the long interaction length that is typically required, and the low bend radius that is a limitation of some waveguide technologies. In $LiNbO_3$ directional couplers, the interaction length is on the order of millimeters and the allowed bend radius is so large that it would be difficult to fit more than about $9 \times 9$ crosspoints on a single substrate. The long range interconnections of a typical multistage interconnect network require sharp bends which are only conceivable when using etched rather than diffused guides.

While such $LiNbO_3$ directional couplers are low loss (such systems having avoided fan-out and fan-in loss by using active devices, for example), when building larger systems by stitching together $9 \times 9$ switching matrices, the input-output coupling loss and propagation losses build up to as much as 25 dB for a 144×144 switching matrix. In addition, crosstalk builds up due to reflections and imperfect switching in such a matrix to such a large extent as to make them unusable for analog applications and to degrade the signal to noise ratio for digital applications as well.

As may be appreciated therefor, further improvement in such interconnection networks could be utilized which maintains high bandwidth and low latency characteristics in a readily reconfigurable interconnection network having low fan-in, fan-out and coupling losses.

SUMMARY OF THE INVENTION

An improved optical interconnecting device and method are provided that substantially eliminate optical fan-out and fan-in losses. The device allows low loss permutations of up to about 30 single mode fiber optic signals, and supports arbitrary modulation formats and extremely high bandwidths. The device can tolerate up to about 10 nm of wavelength spread without achromatization, and significantly more with proper achromatization. Generalized crossbars with broadcast capabilities can also be implemented with the same device. The device includes a plurality of spaced optical signal inputs and outputs at an optical medium, the outputs being differently spaced relative to the inputs. An input angle deriving lens is positioned adjacent to the inputs for deriving different input angles through the medium for optical signals received from different ones of the inputs, and a unit for directing the optical signals proceeding through the medium at the different input angles to selected ones of the outputs is provided at the medium.

The directing unit propagates spatially periodic optical index perturbations in the medium, and preferably includes an acoustic wave transducer. An output angle deriving lens is positioned at the medium adjacent to the outputs for driving different output angles for optical signals received from the directing unit to different ones of the outputs.

The method of this invention includes the steps of introducing optical signals in an optical medium from a plurality of spaced inputs, deriving different input and output angles for optical signals proceeding through the medium, and selectively directing the optical signals proceeding through the medium between selected ones of the input angles and output angles.

A surface acoustic wave integrated optics implementation of the device includes an acoustooptic substrate having a plurality of spaced input channel waveguides and output channel waveguides therein at opposite sides of a slab waveguiding region, input and output angle deriving lens formed in the substrate in the waveguiding region, and an acoustic wave generator, or transducer, for generating acoustic waves having selected frequencies in the wave guiding region between the lenses. These modular devices can be combined by using planar stacked optics techniques in order to implement a Close network with up to about 1000 inputs and outputs which can be reconfigured in a few microseconds, and which will have a latency of only a few nanoseconds.

It is therefore an object of this invention to provide an improved optical interconnecting device and method.

It is another object of this invention to provide an improved optical interconnecting device and method that substantially eliminates optical fan-out and fan-in losses for dynamic interconnection of up to about 30 single mode fiber optic signals to a plurality of single mode fiber optic output fibers.

It is yet another object of this invention to provide an optical interconnecting device having a plurality of spaced optical signal inputs and outputs at an optical medium, an input angle deriving lens positioned adjacent to the inputs for deriving different input angles through the medium for optical signals received from different ones of the inputs, and a unit for directing the optical signals proceeding through the medium at the different input angles to selected ones of the outputs.

It is still another object of this invention to provide an optical interconnecting device having a directing unit which propagates spatially periodic optical index perturbations in the medium for directing signals input into the device to outputs from the device.

It is still another object of this invention to provide a method for selectively directing optical signals between inputs and outputs which includes the steps of introducing optical signals in an optical medium from a plurality of spaced inputs, deriving different input and output angles for the optical signals proceeding through the medium, and selectively directing the optical signals proceeding through the medium between selected ones of the input angles and output angles.

It is yet another object of this invention to provide an acoustooptic interconnecting device which includes an acoustooptic substrate having a plurality of spaced input channel waveguides and output channel waveguides therein at opposite sides of a slab waveguiding region, input and output angle deriving lenses formed in the substrate, and an acoustic wave generator for generating acoustic waves between the input and output angle deriving lenses.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a diagramatic illustration of an optical interconnecting device in accord with this invention;

FIG. 2 illustrates a first beam steering approach for utilization in the device of FIG. 1;

FIG. 3 is a momentum space, or Bragg matching, diagram illustrating the momentum matching surface for the beam steering approach illustrated in FIG. 2;

FIG. 4 illustrates a second beam steering approach for utilization in the device if FIG. 1;

FIG. 5 is a momentum space diagram illustrating the matching surface for the beam steering approach illustrated in FIG. 4;

FIG. 6 illustrates a third beam steering approach utilizable in the device of FIG. 1;

FIG. 7 is a momentum space diagram illustrating the momentum matching surface for the beam steering approach illustrated in FIG. 6;

FIGS. 8A through 8F illustrate phase matching and desired frequency ranges for the beam steering approach illustrated in FIG. 2;

FIG. 9 is a block diagram of a first embodiment of the frequency selection and drive unit for the device of FIG. 1; and FIGS. 10A and 10B are illustrations of a second embodiment of the frequency selection and drive unit.

DESCRIPTION OF THE INVENTION

Optical interconnecting device 21, a modular device formed on single optical substrate 22, is illustrated in FIG. 1. Optical input array 23 is a uniformly spaced array of inputs, which are widely, uniformly spaced so that any two neighboring input signals are resolvable by a factor equal to the number of outputs (M) (while wider spacing of inputs than outputs is, for ease of description illustrated herein, it should be realized that the opposite could as well be utilized to yet achieve the advantages of this invention). Thus the separation between the inputs, $D_i$, is M times the modal width of one of input waveguides 25, 27 and 29. Optical output array 31 is an array of waveguides 33, 35 and 37 which are just resolvable, so that the array of output waveguides are separated by $D_o$, slightly more than the modal width of a single waveguide. Signals from input array 23 are Fourier transformed by first lens 39, with focal length $F_1$, producing a set of collimated beams angularly separated by $\Delta\theta = \tan^{-1}[D_i/F_1]$, which is incident on unit 41 for producing spatially periodic optical index perturbations, for example an acoustooptic, electrooptic or magnetooptic device). Unit 41 produces optical index perturbations having a plurality of selected frequencies, each of which is responsible for directing collimated light from one of the inputs towards a selected output. Second Fourier transform lens 43, with focal length $F_2$, focuses the acoustically-redirected diffracted optical waves onto the destination output waveguides, thereby coupling optical signals input into the device through optical fibers connected with the input waveguides into the selected appropriate output fibers connected with the output waveguides.

The arrangement of optical input and output directions of propagation and the directions of propagation of the various index perturbation frequencies are selected so that each fiber input is matched to only one subject of the frequencies and does not interact with any of the others.

More particularly, for the preferred acoustooptic implementation, the preferred choice of input and output angle termini are the coarsely spaced input array 23 and the finely spaced output array 31 shown depicted in FIG. 1 for a three input and three output single mode fiber interconnect (the number of inputs and outputs however only being limited by transducer time bandwidth). Lens 39 formed in optical medium 22 is used to derive optical angularly multiplexed signal inputs from spatially multiplexed signal inputs. The shallowest signal input angle derived through lens 39 (from input channel waveguide 25) is directed to the shallowest output angle derived at lens 43 by the lowest grating frequency produced at acoustooptic Bragg cell 41 formed at slab surface waveguiding portion 45 of substrate 22 (an acoustooptic medium).

The next two higher grating frequencies produced at Bragg cell 41 will direct the same input to the remaining two output angles, respectively. This set of grating frequencies (the three lowest frequencies for the three input to three output interconnect depicted in the figure) connect only the shallowest input angle to a selected one of the channel waveguide outputs dependent on the grating frequencies. The second lowest input angle (from input channel waveguide 27) is offset from the lowest angle enough to prevent the angular change due to the three lowest grating frequencies from redirecting this light toward the output angles. This requires the range of output angles to be smaller than the spacing between any two neighboring input angles.

A second set of grating frequencies, the three center frequencies for the 3×3 interconnect example illustrated, similarly redirects the light from input 27 to a selected output waveguide of finely spaced output array 31. This arrangement of inputs and outputs makes each grating frequency connect one and only one input to a single output. A third set of grating frequencies (the three highest frequencies for this example) similarly directs light from channel waveguide 29 to a selected output waveguide, this highest input angle being offset from the other input angles to thus prevent the angular change due to the lower sets of grating frequencies from directing this light toward the output angles.

The multitude of resolvable gratings thus produced allows connection of the inputs to the outputs in an arbitrarily irregular order. The number of resolvable gratings (the holographic space - bandwidth product) required is the product of the number of inputs and the number of outputs, only gratings equal to the number of inputs being required simultaneously to be present when the device includes equal numbers of inputs and outputs utilized for a one to one parallel permutation.

A generalized interconnecting device, or crossbar, is conveniently described by the matrix, P, which has elements $p_{ij}$ equal to 0 or 1. For the case of a permutation interconnection P has only one 1 in each row and column. An interconnection between input and output data streams is described by a matrix-vector product, where the rows of the matrix correspond to the intended outputs, and the columns to the inputs. Thus $p_{ij}=1$ implies a connection from the jth input to the ith output. This is illustrated for a particular 3×3 permutation interconnection between 3 input data streams and 3 output data streams as follows:

$$\begin{bmatrix} c(t) \\ a(t) \\ b(t) \end{bmatrix} = \begin{bmatrix} 0 & 0 & 1 \\ 1 & 0 & 0 \\ 0 & 1 & 0 \end{bmatrix} \begin{bmatrix} a(t) \\ b(t) \\ c(t) \end{bmatrix}$$

In the acoustooptic interconnecting device of this invention, the connections are produced by the presence or absence of the appropriate acoustic frequency, corresponding to $p_{ij}=1$ or $p_{ij}=0$ respectively. This implies that $N^2$ independent frequencies are required to represent the full crossbar matrix, and since only TB (aperture time-bandwidth product) independent frequencies are realizable in a Bragg cell, this imposes a limit of N $$< \sqrt{TB} .$$

The acoustic signal corresponding to the P matrix is given by a frequency raster through the matrix $$s(t) = p_{ij} \sin[2\pi(iF_c + jf_f + f_0)t].$$

In this expression $F_c > Nf_f$ is a coarse frequency step corresponding to the angular separation between the widely spaced array of input fibers, $f_f = D_o v_a / F_2 \lambda$ is a fine frequency step corresponding to the narrow angular spacing between the output fibers, and $f_0$ is the carrier frequency.

With the same device that provides the reconfigurable permutation interconnect, we may by only changing the drive signals arrange for the device to perform fan-out interconnections as well. For a fan out of $n_i$ in channel i the amplitude of the signals coupling out of this channel are reduced by the factor $1/n_i$, s(t) is the same as above, but the $p_{ij}$ are now allowed to take the values $1/n_i$. This is illustrated for a $3 \times 3$ interconnection with the fan-out between 3 input data streams and 3 output data streams as follows:

$$\begin{bmatrix} \frac{1}{2}a(t) \\ \frac{1}{2}a(t) \\ b(t) \end{bmatrix} = \begin{bmatrix} \frac{1}{2} & 0 & 0 \\ \frac{1}{2} & 0 & 0 \\ 0 & 0 & 0 \end{bmatrix} \begin{bmatrix} a(t) \\ b(t) \\ c(t) \end{bmatrix}$$

The most efficient acoustooptic interaction is the "tangential phase matching" interaction, achieved through the use of either acoustic beam steering or birefringence. This type of thick hologram has been heretofore utilized for efficiently coupling a narrow range of input optic angles to a wide range of output optic angles. For the interconnection described above, however, the narrow range and wide range of angles correspond to the narrowly spaced and widely spaced output and input arrays, respectively. This arrangement provides a large phase mismatch, and hence little coupling for unintended diffractions, for example the shallowest input angle, described above, interacting with the highest spatial frequency, since this would diffract the beam well beyond the narrow range of output angles. This arrangement for the phase matching also provides low optical loss in the system.

To implement this interconnection with low loss we arrange for acoustic beam steering to provide efficient phase matched interactions only for the selected combinations of input to output interconnection acoustic frequencies. Three means of acoustic beam steering may be used.

Utilizing the segmented transducer beam steering approach illustrated in FIGS. 2 and 3, piezoelectric transducer 47 of Bragg cell 41 is divided into N equal segments 49, each of which is driven through drive wires 51 and 53 with alternating phase at the RF frequency. Composite wavefront 55 defined by transducer segment acoustic wavefronts 57 steers signals at an angle to the normally defined by $$\beta = \sin^{-1}\left[\frac{V}{2fl}\right]$$

where f is the acoustic frequency, V is the acoustic velocity and l is transducer segment size. This angle is designed to provide coupling from the center input angle to the center output angle at the midband frequency, $f_0$ (for example 500 MHz) of Bragg cell 41. Bragg cell 41 is oriented with transducer face 59 normal to center input propagation angle 61 (in FIG. 1). Using the well known Bragg angle formula $$\theta = \sin^{-1}\left[\frac{\lambda f}{2V}\right]$$

where l is the optic wavelength in the medium, this gives the requirement on the transducer segment size $$l = \left[\frac{V^2}{f^2 \lambda}\right]$$

For n coarsely spaced angularly multiplexed inputs we may use up to m finely spaced angularly multiplexed outputs where $$m = N/n$$

and N is the number of resolvable spots in Bragg cell 41 given by $$N = \frac{AB}{V},$$

where A is the optical aperture, B is the RF bandwidth of the Bragg cell and V is the acoustic velocity. The angular spacing at the outputs, $\Delta\theta_{out}$, is given by the angular resolution of Bragg cell 41

$$\Delta\theta_{out} = \sin^{-1}\left[\frac{\lambda}{A}\right]$$

and the input angular spacing is just m times that:

$$\Delta v_{in} = \sin^{-1}\left[\frac{m\lambda}{A}\right].$$

FIG. 3 illustrates the momentum matching surface for the segmented transducer beam steering approach. The momentum space representation is the reciprocal space of the k vectors of the optical and acoustic propagation. The acoustic momentum spread shown here is inversely proportional to the total interaction length $l_+ = ql$, where l is the transducer segment size given above and q is the number of segments. This total interaction length is given by $$l_t = \frac{NV}{B m \sin(2\theta)} \approx \frac{N}{mB_{frac}^1},$$

where the approximation is for small $\theta$, and $B_{frac}$ is the ratio B/f. From this we identify the number of transducer segments $$q = \frac{N}{mB_{frac}}.$$

A staircase transducer beam steering approach is illustrated in FIGS. 4 and 5. While the staircase transducer beam steering approach requires a birefringent medium, it has the advantage over the segmented transducer of steering the acoustic momentum tangentially across the output optic momentum surface as shown by the locus of mean momentum with frequency in FIG. 5. This tangential phase matching allows for the longer interaction length, and thus the higher efficiency. This advantage is obtained at the sacrifice of making the device polarization dependent. Acoustic transducer 63 is segmented in the optical propagation direction, and each segment 65 is displaced in the acoustic propagation direction by a step height h, given by $$h = \frac{nV}{B}$$

where n is the number of coarsely spaced angularly multiplexed inputs, V is the acoustic velocity and B is the Bragg cell bandwidth. For the case of the negative uniaxial crystal acoustooptic medium and small birefringence approximation, the length of each step, l, is given by $$l = \frac{nV^2}{B\lambda f}$$

where f is the center frequency of Bragg cell 41 and $\lambda$ is the optic wavelength.

The angular separations of the input and output beams are the same as given in the segmented transducer beam steering approach heretofore described. FIG. 5 illustrates the momentum matching surface for the staircase transducer beam steering approach.

The two surfaces in FIG. 5 are the momentum surfaces for the ordinary and extraordinary optical polarizations. We have shown here the momentum surfaces for an ordinary polarized incident beam, and an extraordinary polarized diffracted beam in a positive-birefringence uniaxial crystal. The acoustooptic interaction scheme requires orthogonal input and output polarizations. Thus the input polarization is specified and the acoustooptic interaction is a polarization switching interaction which, as is well known, is efficiently achieved with shear acoustic waves in typical crystallographic symmetry groups. This polarization specific interaction is a disadvantage over the segmented transducer design which may be polarization independent. This design has the advantage, however, of allowing us to use a longer total interaction length for greater efficiency.

A segmented staircase transducer beam steering approach is illustrated in FIGS. 6 and 7. The segmented staircase transducer beamsteering approach combines the advantages of the staircase transducer beam steering with the polarization independence of the segmented transducer beam steering design. This design may be made in an optically isotropic medium, providing the same momentum surfaces for both optical polarizations. The tangential beam steering allows this design to match momentums for a long interaction length provide a highly efficient device. The combination of the segmented and staircase transducer approaches heretofore described allows a staircase type momentum matching in a medium which is not birefringent, for example glass. Transducer 67, characteristics transducer segment 69 size, step height and step length are the same as in the staircase array beam steering and segmented transducer array beam steering described heretofore.

These beam steering approaches provide phase matching for the desired frequency ranges as shown in FIGS. 8A through 8F (applicable for the case of segmented transducer beam steering).

The FIGURES illustrate the locus of acoustic momentum versus frequency as regions A through I for the three input to three output interconnection example. FIGS. 8A and 8B depict first signal input J (forming input 25 in FIG. 1) and regions A, B and C are the momentum distributions for the lowest three frequencies. The frequency response of Bragg cell 41 is shown in FIG. 8B. The overlap of acoustic momentum distributions A, B and C with output index surface K for these first three frequencies allows efficient coupling to light propagated at these output angles.

The remaining momentum distributions for the remaining six frequencies (D through I) fall off output index surface K preventing these frequencies from coupling input J to any output angle. FIGS. 8C and 8D, and FIGS. 8E and 8F are similar illustrations for second input signal L and third input optical signal M, respectively. In these cases the higher frequency acoustooptic waves direct the signals between input angles and selected output angles as illustrated. As may thus be appreciated the device of this invention provides three nonoverlapping frequency responses, one for each input, and these inputs are mapped by control of the fine frequency within each frequency band to the desired outputs.

The fabrication of a basic 12×12 device for use with a basic 12 single mode optical fiber ribbon at its input and output requires fabrication of three functional elements on the same acoustooptic substrate 22: a segmented and/or stairstep surface acoustic wave transducer (47, 63 or 67) together with its associated radio frequency (RF) feedline/matching networks; diffraction limited substrate lenses 39 and 43; and optical waveguide channels 25, 27, 29, 33 35 and 37 and slab waveguiding region 45 which couple input fibers to input array 23 and thus to substrate 22 through region 45 and to output waveguide array 31 coupled to the output fibers.

Surface acoustic wave (SAW) transducers with responses into the low Gigahertz regime have been fabricated in LiNbO$_3$ substrate by various groups over the last two decades. Transducers which operate in the hundreds of Megahertz regime require interleaved finger electrodes of millimeter lengths and micron spacings. These structures can be driven with coplanar feedlines/matching networks with millimeter line and feature dimensions. Such structures can be designed using the standard rules of transmission line design. Both the transducers and feedline structures for this frequency regime can therefore be routinely patterned by standard photolithographic techniques and simple evaporative metallization.

Surface acoustic waves have been made to propagate in LiNbO$_3$ crystals in a number of crystallographic orientations. There are several considerations in choosing a crystal cut and optimal orientation, such as optical waveguiding and lensing considerations. In addition, the photoelastic interaction between the propagating surface waves and the optical slab guide modes must be optimized, and both polarizations of the optical inputs must be guided. Most SAW acoustooptic devices are fabricated using Y-cut LiNbO$_3$ crystals, a Z propagating SAW, and a nominally X propagating optical beam. When one takes X to be the nominal optical propagation axis, Y-cut crystals allow use of both an ordinary (Y) and an extraordinary (Z) polarization, thus allowing the standard orientation to be utilized for anisotropic diffraction if both polarizations can be guided. Other orientations optimized for the particular application could be utilized.

Other material systems could be implemented for utilization with this invention, such as glass and/or GaAs. There are several advantages to the use of GaAs, including the availability of large wafers, a slow Rayleigh wave velocity in all cuts, numerous optical waveguiding possibilities using either MBE grown layers or diffused layers as well as etched channels, and excellent acoustooptic properties.

Two indiffusion techniques can be utilized in waveguide/lens fabrication on $LiNbO_3$, titanium indiffusion or proton exchange. Although each technique has its own sets of advantages, they are similar in that both require masking for pattern definition followed by a temperature induced indiffusion. By employing a multiple masking technique, the advantages of both of the techniques can be employed to obtain novel guiding structures.

In the titanium indiffusion method, first waveguide channel regions are photolithographically defined and then a given thickness of titanium is evaporated over the whole surface of the sample. The excess titanium is lifted off and the sample is placed in an oven at a high temperature (greater than 900° C. but considerably less than the Curie temperature for $LiNbO_3$, approximately 1250 C.). Generally, as the evaporated metal layers are of the order of a thickness of a few thousand angstroms and a guiding layer must be of a thickness of microns, the diffusion is governed by the equations for the diffusion from an infinitesimally thin, finite width source and therefore the diffusion profile essentially takes on the typical Gaussian width and error function depth form.

The effect of titanium concentration on refractive index is to increase both indices, the ordinary linearly by an amount which always exceeds that of the extraordinary, at least at the wavelengths of interest (red through near infrared). As the ordinary index exceeds the extraordinary throughout the wavelength regime of interest, titanium indiffusion always increases the intrinsic birefringence of the material. Titanium indiffusion can be applied to any crystal cut.

In the proton exchange process, the crystal is first covered with a thin metal film, generally aluminum. This film is then etched away over the desired waveguide channel areas and then the crystal is immersed in a molten benzoic acid bath at a temperature between the melting point (100° C.) and boiling point (250° C.) of benzoic acid. This process produces thin exchanged regions with cross sections identical to the mask opening and step-like index concentrations in the exposed regions of the crystal. The index contrast for the extraordinary index is large (0.1 as compared to 0.01 for a typical titanium contrast) and positive in sign, whereas the index contrast for the ordinary index is an order of magnitude smaller and negative.

The exchange depths, however, are exceedingly small (tenths of microns) even for large exchange times, and, therefore, one generally anneals the samples at temperatures of about 300 C. for several hours, to tailor the index profile to the desired index shape. Prior titanium indiffusion or introduction of buffering agents into the acid melt may also be desirable.

Any technique that can be used to raise the substrate index can be used to form lenses and waveguides. The added degrees of freedom allowed by the anneal step as well as the nonlinearity of the proton exchange process make this process a very advantageous one. When using a Y-cut crystal, however, use of both the titanium indiffusion method together with the proton exchange method to produce substrate lenses is desirable, as direct proton exchange of the Y-cut substrate without prior titanium indiffusion has a tendency to destroy the surface. In that process, titanium indiffusion is combined with proton exchange (TIPE). A mask is produced which defines the regions of the surface and channel waveguides, the photolithography is then carried out and titanium is indiffused into the regions. A second mask is then used to define the desired lensing regions and this mask is applied in a one step exchange process in these regions. As the exchange process is a low temperature process, and is carried out last, this procedure causes no degradation of the substrate. An added proton exchange and anneal step prior to the final lens exchange could be used to control the desired amount of birefringence in the various regions of the substrate.

For optical wavelengths greater than about 0.6 microns, single mode waveguide channels will have mask dimensions of greater than about 2.5 microns, and therefore the photolithography can be carried out by standard techniques. Depending on the system requirements for power handling and polarization control, it may be preferable to use TIPE in these guiding regions.

Device 21 may be pigtailed at input array 23 and output array 31 to arrays of optical fibers. The best technique for pigtailing utilizes standard ribbon fibers both at the input and output. For example, 12 fiber optical fiber ribbons now come with polished V-grooves for device pigtailing on one end, and standard fiber connectors for further fiber connection on the other. A standard pigtailing jig can therefore be used to epoxy the V-groove to the input, and output waveguide arrays on an $LiNbO_3$ substrate chip 22. Connection can then be simply made to pigtailed lasers and detectors for circuit testing.

A major advantage of the proposed optical interconnecting device is the modularity available in such a design. It becomes very difficult to increase the time bandwidth of a SAW beyond about 1000, making it complicated to handle more than about 30 inputs and outputs. However, in order to build larger interconnection systems many different substrates could be combined together. One way this can be accomplished utilizing a 12×12 device is by stacking twelve such individual devices on top of each other, coupling the outputs of these twelve through an N way passive perfect shuffle network to the inputs of a second set of twelve stacked modules, and coupling the outputs through another N way perfect shuffle to a third stack of 12 modules in order to implement a Close interconnection network connecting 144 inputs to 144 outputs. The N way perfect shuffles can be simply implemented by rotating the central stack so it is at right angles to the first and last stack.

Frequency selection networks and RF driver electronics utilizable with this invention are illustrated in FIGS. 9 and 10A and 10B. FIG. 9 shows an RF crossbar 75 for the fine frequencies corresponding to the destination address of input signals, each output of which is mixed at mixers 77 with a coarse frequency corresponding to the input fiber address. These outputs are summed, amplified and applied to the SAW transducer (47, 63 or 67).

An alternative approach is illustrated in FIGS. 10A and 10B. Comb generator 79 produces the lattice of possible driving frequencies on a single wire. An array of electronically tunable frequency selective filters 81 (equal in number to the number of fiber inputs) operate in each of the coarse frequency windows to select the desired combination, as illustrated in FIG. 10B.

The optical transparency of the device of this invention (the avoidance of optical-to-electronic-to-optical conversion) indicates that almost any modulation format and bandwidth can be transmitted through this switch, without excessive requirements on an electronic switching fabric, thereby placing as few restrictions as possible on the domain of application. Analog modulation formats that could be used include direct intensity modulation, subcarrier frequency and phase modulation, as well as coherent modulation formats requiring heterodyne detection, as long as the arbitrary doppler frequency shifts produced by routing through a single acoustooptic crossbar, or a network of crossbars can be tolerated by the heterodyne demodulation detector. Digital modulation formats compatible with this device include NRZ, RZ, Manchester, bipolar, intensity modulated carrier frequency and phase shift keying, pulse position modulation, and pulse width modulation.

As may be appreciated, the device of this invention provides a permutation network using a single acoustooptic device which is optimized for this application, rather than attempting to use an existing multichannel acoustooptic Bragg cell optimized for scanning and deflection. By optimizing the design of the acoustooptic device for the systems application of a space division permutation network switch between arrays of single mode fibers, significant performance advantages can be achieved. Primary among the advantages of the device is the capability for implementing nearly lossless optical permutations of single mode fibers, independent of network size. In addition, the device complexity is significantly reduced by folding the entire structure into 2 dimensions, which allows the stacking of these devices into compact 3-dimensional arrays of crossbars in order to efficiently implement larger networks.

This invention thus provides a generalized crossbar routing system which can provide low loss programmable interconnections and high speed reconfiguration between arrays optical fibers. The system loss is limited by the fundamental fan-out fan-in loss $1/n_i m_j$, where $n_i$ is the degree of fan-out of the ith input channel, resulting in $n_i$ way power splitting, and $m_j$ is the degree of fan-in to the jth single mode output fiber. The loss in each channel is independent from each of the others, and adapts as fast as the network is reconfigured to a new interconnection topology.

For a one-to-one permutation network the system is essentially lossless. The output is efficiently collected by an array of single mode fibers which are identical to the input single mode fibers, thereby allowing concatenation of the modular device herein described into larger networks without intervening electronic detection. The reconfiguration time is the aperture time of the Bragg cell, which can be between 100 nsec and 10 μsec. This fast reconfiguration will make appropriate application of the device in interprocessor interconnections, video switching, and packet switched communications network.

What is claimed is:

1. An optical interconnecting device comprising:
   an optical medium;
   a plurality of spaced optical signal inputs adjacent to said medium;
   a plurality of spaced optical signal outputs adjacent to said medium, said optical outputs being differently spaced relative to said optical inputs;
   input angle deriving means adjacent to said inputs for deriving different input angles through said medium for optical signals received from different ones of said inputs; and
   directing means at said medium for selectively directing any of said optical signals proceeding from said deriving means through said medium to any selected one of said outputs.

2. The device of claim 1 further comprising output angle deriving means adjacent to said outputs for deriving different output angles for directed optical signals from said directing means to different ones of said outputs.

3. The device of claim 2 wherein said input angle deriving means and said output angle deriving means are Fourier transform lenses formed in said optical medium.

4. The device of claim 1 wherein said medium is an acoustooptic medium and wherein said directing means includes an acoustic wave transducer.

5. The device of claim 1 wherein said inputs and said outputs are channel waveguides formed at opposite sides of said optical medium, said optical medium defining a slab waveguiding region between said inputs and said outputs.

6. The device of claim 1 wherein said directing means simultaneously directs a plurality of said optical signals proceeding from said deriving means to selected different ones of said outputs.

7. An acoustooptic interconnecting device comprising:
   an acoustooptic substrate having a plurality of spaced input channel waveguides and spaced output channel waveguides described therein at opposite sides of a slab waveguiding region, said input waveguides being differently spaced relative to said output waveguides;
   an input signal angles deriving lens and an output signal angles deriving lens formed in said substrate in said waveguiding region, said input signal angles deriving lens deriving different input angles through said waveguiding region for optical signals received from different ones of said input waveguides; and
   acoustic wave generating means including a transducer having a plurality of stages positioned at said substrate between said lenses for generating acoustic waves having selected frequencies in said waveguiding region of said substrate for redirecting any of said optical signals received thereat at said different input angles to achieve any selected one of said output angles depending on said frequency selected.

8. The device of claim 7 wherein said input waveguides are more widely spaced than said output waveguides, and wherein spacing of all of said output angles is smaller than spacing between any two neighboring said input angles.

9. The device of claim 7 wherein said transducer is one of a transducer having a plurality of segments driven in alternating phase, a staircase transducer, and a segmented staircase transducer, and wherein said transducer and a part of said slab waveguiding region form a Bragg cell.

10. The device of claim 9 wherein said acoustic wave generating means includes an RF crossbar connected with a plurality of mixers for producing a signal for said transducer which includes fine frequencies within coarse frequency windows.

11. The device of claim 7 wherein said acoustic wave generating means includes a comb generator for producing a lattice of driving frequencies connected with an array of electronically tunable frequency selective filters for selecting a desired frequency combination.

12. The device of claim 7 wherein said transducer has a plurality of segments.

13. The device of claim 7 wherein said transducer is a single acoustic wave transducer having a plurality of segments driven in alternating phase, each one of said segments being displaced in the acoustic propagation direction by a selected step height.

14. A method for selectively directing optical signals between inputs and outputs comprising:
    introducing optical signals in an optical medium from a plurality of spaced optical inputs;
    deriving different input angles in said medium for optical signals received from different ones of said inputs; and
    selectively directing any of said optical signals proceeding at said input angles through said medium to any selected one of a plurality of spaced optical outputs, said optical outputs being differently spaced relative to said optical inputs.

15. The method of claim 14 wherein said optical signals are selectively directed by spatially periodic optical index perturbations propagated in said optical medium and having various frequencies, each one of said optical input signals from said plurality of inputs interacting with only some of said frequencies of said perturbations.

16. The method of claim 15 wherein said spatially period optical index perturbations are acoustic waves and wherein said medium is an acoustooptic medium.

17. The method of claim 14 wherein the step of introducing optical signals in an optical medium includes the step of providing a plurality of spaced channel waveguide inputs and spaced channel waveguide outputs at opposite sides of said medium and defining a slab waveguiding region between said inputs and said outputs.

18. The method of claim 14 further comprising the step of deriving different output angles in said medium for selectively directed optical signals to selected ones of said outputs.

19. The method of claim 18 wherein said optical inputs are more widely spaced than said optical outputs, and wherein spacing of all of said output angles is smaller than spacing between any two neighboring said input angles.

20. The method of claim 14 wherein the step of selectively directing optical signals includes the steps of propagating surface acoustic waves through said medium at a plurality of selected frequencies, said frequencies comprising a number of frequency ranges equal to the number of inputs, each of said frequency ranges being divided into a plurality of fine frequencies equal to the number of said outputs, each one of said optical input signals from said plurality of inputs interacting with only one of said frequency ranges, said fine frequencies in said frequency ranges being present at said optical medium to selectively direct said optical signals to selected one of said outputs.

* * * * *